No. 619,554. Patented Feb. 14, 1899.
G. H. FOX.
MOLD.
(Application filed May 3, 1898.)
(Model.) 2 Sheets—Sheet 1.

WITNESSES:
George L. Dolbeare
Alfred M. Potter

INVENTOR.
George H. Fox.
BY E. Frank Woodbury.
ATTORNEY.

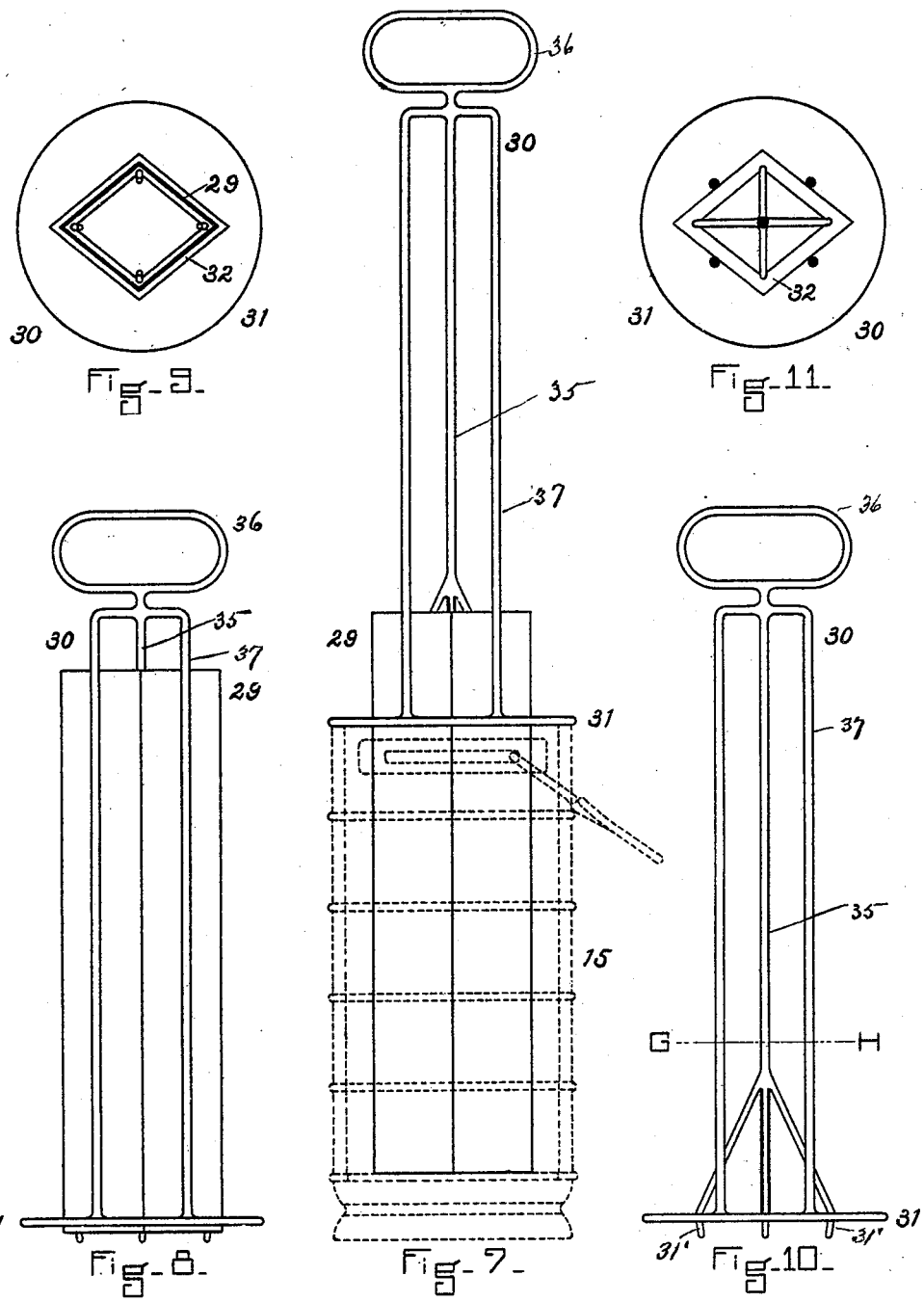

UNITED STATES PATENT OFFICE.

GEORGE H. FOX, OF BANGOR, MAINE.

MOLD.

SPECIFICATION forming part of Letters Patent No. 619,554, dated February 14, 1899.

Application filed May 3, 1898. Serial No. 679,651. (Model.)

*To all whom it may concern:*

Be it known that I, GEORGE H. FOX, a citizen of the United States of America, residing at Bangor, in the county of Penobscot and State of Maine, have invented certain new and useful Improvements in Molds, of which the following is a specification.

My invention relates to a mold principally designed for molding ice-cream or other articles into ornamental designs.

The mold comprises an outer receptacle and an inner receptacle disposed in the outer receptacle, the inner receptacle being removable after the material is molded and the outer receptacle being adapted to serve as a jar for containing the molded material after the molding and shaping thereof. The outer receptacle is adapted to form a storage-jar, which may be square, hexagonal, octagonal, or of any other desired shape in cross-section, and the inner receptacle may be of any desired design. In the use of the mold for shaping and storing ice-cream absolute cleanliness is secured, which is not always the case in the use of the ordinary tin mold. No water can get into the jar and spoil or injure its contents, as is often the case with the common molds. The cream is not exposed to the air until the moment of serving, while in the old brick form it is usually out upon a serving-dish and it is melting before serving. If any part of the cream is not used, the stopple and cover can be replaced, the jar repacked in ice, and the cream kept for future use.
There is absolutely no danger or liability of poisoning. In using the forms one, two, three, or more kinds and colors of cream can be packed in a jar, and various designs—such as a diamond, star, heart, crescent, initial-letter, and the like—may be placed through the center of a jar of cream. In removing the ordinary mold from the ice it has to be dug out, while my improved jar may be lifted out of the ice by the bail without wetting the hands. The cream after being thoroughly hardened will keep firm in the jar for an hour or more after being taken out of the ice.

The jar and its false bottom or disk and cover are preferably made of glass, while the cover-gasket and stopple are made of rubber, cork, or other suitable material. The spring lock-bail is made of any suitable spring metal.

Figure 2:
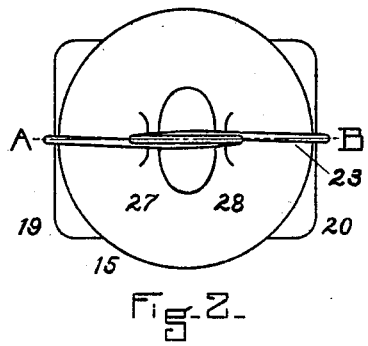
Figure 4:
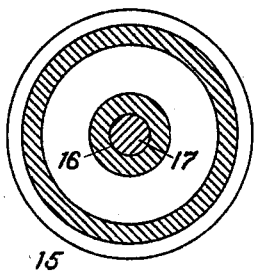
Figure 6:
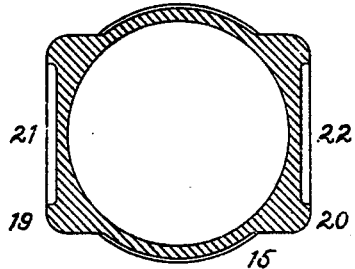
Figure 1:
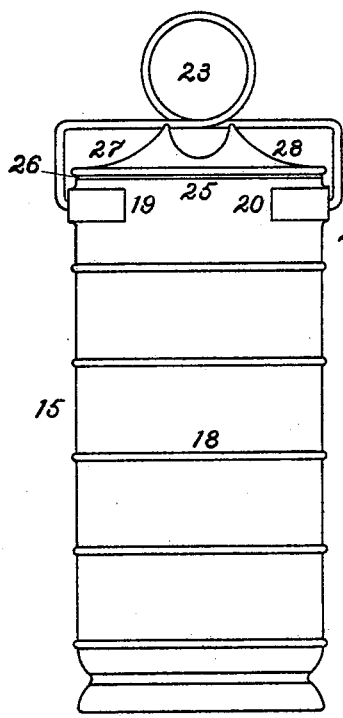
Figure 3:
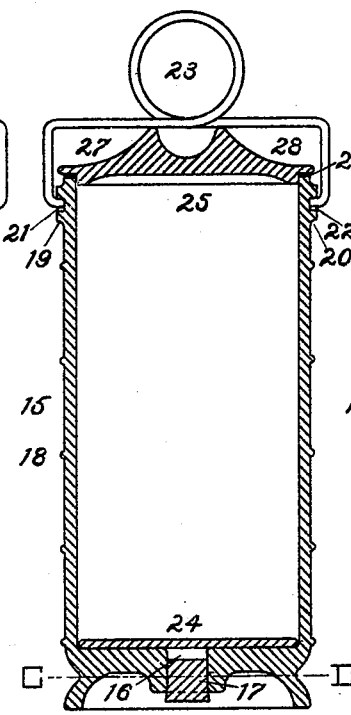
Figure 5:
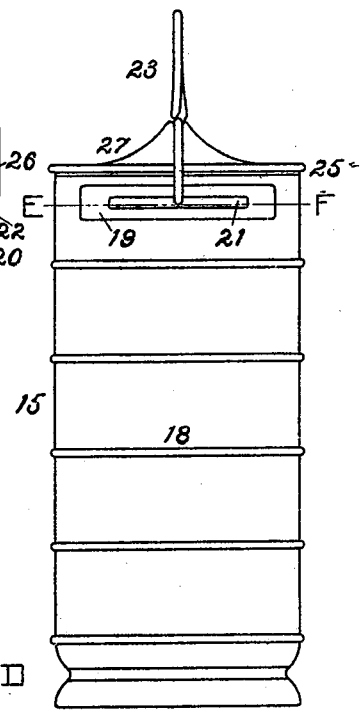

Figure 1 represents in front elevation the outer receptacle of this improved mold adapted to serve as a storage-jar. Fig. 2 is a plan of Fig. 1. Fig. 3 is a vertical sectional view of the outer receptacle on section-line A B of Fig. 2. Fig. 4 is a full cross-sectional view of the outer receptacle on section-line C D of Fig. 3. Fig. 5 represents the outer receptacle in side elevation. Fig. 6 is a cross-sectional view on section-line E F of Fig. 5. Fig. 7 represents the inner receptacle, in the form of a diamond, in connection with the stripping apparatus in position for the commencing of the stripping operation, the outer receptacle being represented by dotted lines. Fig. 8 represents in elevation the diamond-shaped inner receptacle and the stripping mechanism when removed from the outer receptacle after the stripping operation has been accomplished. Fig. 9 is an inverted plan of Fig. 8. Fig. 10 represents in elevation the stripping apparatus, and Fig. 11 is a cross-sectional view of Fig. 10 on line G H.

The apparatus comprises a two-part mold composed of an inner receptacle and an outer receptacle, which are adapted to form a core of molded material of one color or character surrounded by an inclosing mass of molded material of another color or character. The outer receptacle may be in the form of a portable jar 15, adapted to serve as a convenient package for storing, carrying, and serving ice-cream, and the inner receptacle 29, which is disposed in and removable from the outer receptacle, may be of any suitable shape in cross-section. In connection with the two-part mold a stripping device is used which operates to hold the molded material of different colors or characters in their relative positions during the withdrawal of the inner receptacle from the outer receptacle.

The outer receptacle 15 is provided with an aperture 16, through which the material may be pushed out of the jar for use after being molded. This aperture may be closed by a stopper 17. When the receptacle is used as a storage-jar, it receives a bail 23. A disk 24, 100 which may constitute a false bottom, is disposed in the outer receptacle and serves as a plunger for removing the contents of the jar by means of a rod inserted through the aperture 16.

The inner receptacle 29, which may constitute the inner receptacle of the two-part mold, and the stripping apparatus or device 30 are shown in Figs. 7, 8, 9, 10, and 11. The inner receptacle 29, open at both ends, is usually made of tin-plate. It is somewhat longer than the jar or outer receptacle 15. The stripping device 30 is provided with circular plate 31, adapted to serve as a temporary cover for the jar, and it is provided with the diamond-shaped slot 32, through which the diamond inner receptacle is raised in the stripping operation, and it is made, as shown in the drawings, so that the inner receptacle can be drawn up into the position as shown in Fig. 8. When the inner cylinder 29 is of a different form in cross-section, the slot 32 will of course correspond in shape therewith. This plate is provided on its under side with guide-lugs 31', which facilitate its insertion in the mold by guiding the slot in the plate to a point opposite the edge of the upper ends of the inner section 29. The cover 31 when the slot is continuous is divided into two parts, one plate serving to cover the inner receptacle of the mold and the other plate serving to cover the space between the inner and outer receptacles. A wire 35, provided with a handle or loop 36 at its upper end, is connected at its lower end with the inner plate of the cover, and branch wires 37, connected with the wire 35, extend to the outer plate, these wires serving as a holder for the inner receptacle when it is removed from the outer one.

In packing or filling the jar with two kinds and colors of ice-cream, employing the diamond form and using, for instance, vanilla ice-cream, which is cream-white in color, between the inner and outer receptacles and pistachio ice-cream, which is light green in color, inside the inner receptacle, the operation is as follows: The disk is placed in the bottom of the outer receptacle or jar. The aperture is stoppled. The inner receptacle is placed in its central position within the jar, as shown in Fig. 7, with its lower end resting upon the disk. The vanilla ice-cream is packed into the space between the inner receptacle and jar. The pistachio cream is packed into the diamond-shaped space within the inner receptacle. The stripping device is placed in the position as shown in Fig. 7. The operator, holding the stripping device firmly in its position on top of the jar, raises the diamond inner receptacle out of the outer receptacle or jar into the position shown in Fig. 8, thereby completely stripping the ice-cream from the inner receptacle, after which both stripping device and inner receptacle are removed from the outer receptacle or jar. The cover-gasket and cover are put in place on top of the jar, the cover being securely held in position by the spring lock-bail, which engages the top of the cover. Upon the completion of the operations described the outer receptacle or jar filled with ice-cream is then ready to be packed in ice for storage, and the diamond-shaped section of pistachio ice-cream occupying a center space through the vanilla ice-cream, thereby producing a contrast of colors of a light-green diamond upon a cream-white ground.

In serving the packed ice-cream the operation is as follows: The jar is taken from the packed ice neatly and readily by means of the bail. It is wiped clean. The use of hot water is not desirable. The stopple and cover are removed. A small stick is inserted through the bottom aperture and the disk is forced up to the first-portion mark or bead, thereby forcing the ice-cream above the top of the jar just enough for one portion or order of cream, which order is cut off. This process is repeated or continued until the jar is emptied.

It will be observed that the jar is marked for five portions; but these marks may be disregarded at the pleasure of the operator.

In packing butter, cheese, and the like it would not be necessary to use a form and the stripping device.

What I claim as new and desire to secure by Letters Patent is—

1. The combination of an outer receptacle, a bottomless inner receptacle disposed within the outer receptacle, said receptacles being adapted to form a core of the molded material of one color or character inclosed in a surrounding mass of molded material of another color or character, and a stripping device which holds the molded material of different colors or characters in their relative positions during the withdrawal of the inner receptacle from the outer receptacle.

2. The combination of a mold and a stripping device comprising a plate adapted to fit the mold and a rod attached to said plate, said plate having guide-lugs on its under side for facilitating its insertion in the mold.

3. A stripping device for a duplex mold comprising a cover for one end of said mold comprising a plate fitting between the outer and inner parts of the mold, and a plate fitting within the inner receptacle of the mold, and a device connecting the two parts of said cover.

4. A stripping device for a duplex mold comprising a cover for one end of said mold comprising a plate fitting between the outer and inner parts of the mold, and a plate adapted to fit within the inner receptacle of the mold and provided on its under side with guide-lugs for facilitating its insertion therein, and a device connecting the two parts of said cover.

5. A stripping device for a duplex mold comprising a cover for one end of said mold, comprising a plate fitting between the outer and inner parts of the mold, a plate adapted to fit within the inner receptacle of the mold, and a device composed of a handle-rod connected with said inner plate and guide-rods connected with said outer plate and with said handle-rod.

In testimony whereof I have signed my name to this specification in the presence of two subscribing witnesses.

GEORGE H. FOX.

Witnesses:
T. W. VOSE,
CHARLES C. DOWNS.